Patented May 26, 1942

2,284,280

UNITED STATES PATENT OFFICE 2,284,280

SYNTHETIC RUBBERLIKE MATERIALS FROM 1-CYANOBUTADIENE-1,3 AND 2-CHLOROBUTADIENE-1,3

Bernard James Habgood, Elias Isaacs, and Leslie Budworth Morgan, Blackley, Manchester, England, assignors to Imperial Chemical Industries Limited, a corporation of Great Britain No Drawing. Application September 20, 1939, Serial No. 295,838. In Great Britain September 22, 1938

9 Claims. (Cl. 260—86)

This invention relates to improvements in the manufacture and application of new synthetic rubber-like materials.

According to the invention, we manufacture synthetic rubber-like materials by interpolymerisation of a mixture in suitable proportions of 2-chlorobutadiene-1:3 and 1-cyanobutadiene-1:3.

Also according to the invention we vulcanise the polymerised products obtained by the above process by subjecting them to heat treatment in the presence of compounding ingredients.

It is known to make synthetic rubber-like materials by the polymerisation of various unsaturated aliphatic hydrocarbons or their derivatives, but the synthetic materials which have proved the most valuable are those made by polymerising butadiene-1:3 along with various other polymerisable substances, including styrene, acrylic esters and acrylonitrile, and those made by polymerising 2-chlorobutadiene-1:3. Both these kinds of rubber-like materials have this very important advantage over natural rubber that they are much less affected by oils and solvents and in consequence of this advantage they can be used for many purposes for which natural rubber cannot. The highest resistance to oils and solvents is however only obtained at the sacrifice of other properties, more especially the working properties of the unvulcanised material. We have now found that by interpolymerising 2-chlorobutadiene-1:3 and 1-cyanobutadiene-1:3, rubber-like materials are obtained, which after vulcanisation have a resistance to oils and solvents as high as or higher than any previously obtainable, and which have also good working properties.

It is known that 1-cyanobutadiene-1:3 itself will polymerise, but the polymer is too deficient in elasticity and other rubber-like properties to be used as a synthetic rubber-like material, unless perhaps for very special purposes. 2-chlorobutadiene-1:3 has been previously interpolymerised with other polymerisable substances, but not with 1-cyanobutadiene-1:3. Nor has 1-cyanobutadiene-1:3 been previously interpolymerised with any other material for the purpose of making a synthetic rubber-like material.

We have found that 1-cyanobutadiene-1:3 differs from many of the other compounds, which have been interpolymerised with 2-chlorobutadiene-1:3, in that it interpolymerises with 2-chlorobutadiene-1:3 in proportion to the amount of 1-cyanobutadiene-1:3 present and that there is little or no loss nor special manipulation for recovery due to unpolymerised 1-cyanobutadiene-1:3, and very good yields of rubber-like products are obtained, equal to or approaching the combined weights of the 2-chlorobutadiene-1:3 and the 1-cyanobutadiene-1:3 taken. We have also found that the process of interpolymerisation of 1-cyanobutadiene-1:3 and 2-chlorobutadiene-1:3 is one which has the advantage over many other interpolymerisation processes leading to synthetic rubber-like materials in the ease and convenience with which it proceeds. This advantage will be evident from what follows.

This invention does not exclude the use of minor proportions of other polymerisable substances, for example, substances which are known to polymerise with 2-chlorobutadiene-1:3 such as styrene, methyl methocrylate, butadiene-1:3, vinyl acetate and acrylonitrile, along with the 2-chlorobutadiene-1:3 and the 1-cyanobutadiene-1:3 which are the necessary ingredients. The inclusion of such other polymerisable substances is not however generally necessary for the purposes of the invention. They may be made where desired for the purpose of effecting minor modifications in the properties of the rubber-like materials.

The proportions in which the substances to be polymerised are to be used will depend upon the properties required in the resulting products, especially upon the degree of resistance to oils and solvents, which is required. A useful improvement in resistance can be obtained with as low a proportion of 1-cyanobutadiene-1:3 as 5%, i. e. 5% of 1-cyanobutadiene-1:3 and 95% of 2-chlorobutadiene-1:3. For very many purposes where a high degree of resistance is needed a proportion of 1-cyanobutadiene-1:3 of about 20% will be the most satisfactory. Rubber-like products which are almost unaffected by oils and solvents, except under very severe conditions, are obtained by the use of 20% and these products have also good working properties. While higher proportions, e. g. 30% and 40% may also be used, these proportions are not so generally useful. Proportions of 50% or over may be used where oil and solvent resistance requirements overrule elasticity or other mechanical property requirements. The rubber-like products of this invention are compatible with those of polymerised 2-chlorobutadiene-1:3 and the products may be used in admixture. Similarly rubber-like products of the invention containing different proportions of 1-cyanobutadiene-1:3 may be used together in admixture. Products containing higher proportions of 1-cyanobutadiene-1:3 may be used for blending with products containing lower proportions in order to increase the oil and solvent resistance properties of the former. By appropriate admixture of two different products in different ratios a range of products can be obtained.

Polymerisation is conveniently effected in acqueous emulsion. Emulsification and polymerisation can, if desired, be effected as a single technical operation by agitating the 2-chlorobutadiene-1:3 and 1-cyanobutadiene-1:3 with water in the presence of an emulsifying agent at the temperature at which polymerisation is to be effected, and then continuing the agitation long enough for the polymerisation to take place. Alternatively the two substances to be polymerised may be separately emulsified in water and the two emulsions mixed in the polymerising vessel. Sodium oleate, triethanolamine stearate, sulphonated oleic acid, sodium iso-propylnaphthalene-sulphonate, sodium cetyl sulphate methosulphate, cetyl p-dimethylaminobenzoate and other salts derived from long chain bases and inorganic or organic acids are suitable emulsifying agents.

The polymerisation proceeds readily and continues until the 2-chlorobutadiene-1:3 and the 1-cyanobutadiene-1:3 are both completely or nearly completely entered into polymerisation. A slight degree of acidity, e. g. one corresponding to an acidity of pH3 is convenient. Such acidity can be obtained by adding appropriate small quantities of acetic acid and sodium acetate or other similar electrolytes. There may also be added to the polymerisation mixture catalysts such as organic or inorganic peroxides, modifying agents such as sulphur or sulphur-containing compounds, for example, sulphur dioxide, hydrogen sulphide and mercaptans and the other sulphur compounds used for analogous purposes in British Specifications Numbers 497,420, 497,638 and 497,706, or modifying agents, which are organic compounds containing chlorine directly attached to carbon. In general, however, polymerisation catalysts, modifying agents or other additional compounds are unnecessary because polymerisation proceeds satisfactorily without them. In this respect of easy polymerisation, the process of the invention is superior to those of many other inventions for making synthetic-rubber-like materials, because these latter are liable to be slow or only partial or easily adversely influenced by impurities, or to yield good products only when polymerisation is stopped before completion. The temperatures at which polymerisation takes place are also convenient, namely between 5 and 40° C. and especially about 20° C. When the polymerisation has proceeded as far as is desired, there may then be added to the mixture substances having an antioxidant and/or stabilising action, such as phenyl-β-naphthylamine and tetramethylthiuram disulphide. These substances tend to stop any further polymerisation in emulsion.

The products of polymerisation are produced in latex-like form and they may be obtained in massive form by coagulating the latex, separating the coagulum, washing and drying. The coagulation may be effected by the addition of saturated sodium chloride solution, by freezing, or in other known ways, e. g. by the addition of sodium hydroxide or ethyl alcohol depending upon the emulsifying agent which has been employed. Washing and drying may be effected by convenient means, as on heated rollers i. e., using a rubber roller mill which is furnished with a device for washing, e. g. a water spray and for steam heating of the rolls for drying when washing is completed. If the substances with antioxidant and/or stabilising action, which have just been mentioned, have not been added to the emulsion they should advisedly be added during drying. They tend to stop undesired further polymerisation either during drying or during later use and also they give rather more plastic products. It is inadvisable to dry above 60° C. as above 60° C. premature cure may set in. Where for any reason it is desired to add other plasticizing agents this can often be done conveniently during the washing. Chlorinated organic compounds, such as chlorinated naphthalene and chlorinated paraffin wax in quantities up to about 5% of the weight of the rubber-like material, are suitable plasticising agents.

The dry rubber-like materials can be compounded with vulcanising agents, fillers and reinforcing pigments on standard rubber machinery. Vulcanisation is effected by a heat treatment and the vulcanisates are superior to those obtained from natural rubber in their resistance to lubricating oils and hydrocarbon solvents.

In general compounding and vulcanising may be carried out with the same technique as that used in polymerising 2-chlorobutadiene-1:3. Magnesia, wood rosin, zinc oxide and carbon black are convenient compounding and/or curing agents. As with polymerised 2-chlorobutadiene-1:3 the vulcanising properties are represented by a flat curing curve and overvulcanisation does not easily take place.

Sulphur can be usefully employed as a secondary vulcanising ingredient and enables vulcanisates to be obtained with higher tensile strength and modulus, increased Shore hardness and lower permanent set.

Compared with oil resisting rubber-like substances such for example as may be obtained by the interpolymerisation of butadiene with acrylonitrile in aqueous emulsion, the product obtained according to the present invention gives vulcanisates which are equally resistant to oil and which have excellent physical properties such as high tensile strength, resilience and low permanent set. At the same time the materials obtained according to the present invention are very plastic and can be worked without difficulty on normal rubber machinery. In fact, the properties of the products of the present invention are such that they can be worked in batches as big as those used with natural rubber.

The following examples, in which parts are by weight, illustrate but do not limit the invention.

*Example 1*

47 parts of 2-chlorobutadiene-1:3 and 20 parts of 1-cyanobutadiene-1:3 (made for example by the process of British application Number 11387/38 or British application No. 36004/38) are added to a solution of 10 parts of sodium cetyl sulphate, 1.2 parts of sodium thioglycollate, 0.7 part of hydrochloric acid and 0.24 part of sodium hydrosulphide in 275 parts of water. The whole is emulsified by rapid stirring and then warmed to 40° C. and kept at this for 2½ hours. Since polymerisation proceeds exothermically it is necessary to use external cooling for a short time after the temperature approaches 40° C. After the 2½ hours, 0.35 part of tetramethylthiuram disulphide and 0.35 part of phenyl-β-naphthylamine are added, and the latex coagulated by stirring with 500 parts of saturated aqueous sodium chloride solution. The coagulum is washed and dried on a rubber roller mill. 53 parts of an elastic rubber-like material are obtained.

Example 2

The product obtained in Example 1 is included in the following mix:

|  | Parts |
|---|---|
| Product of Example 1 | 100 |
| Magnesium oxide | 10 |
| Wood rosin | 5 |
| Phenyl-β-naphthylamine | 2 |
| Cottonseed oil | 5 |
| Gas black | 35 |
| Sulphur | 1 |
| Zinc oxide | 10 |

The mix is cured for one hour at 141° C. A vulcanisate is obtained which has the following physical properties:

| | |
|---|---|
| Hardness (degrees Shore) | 64 |
| Elasticity (degrees Shore) | 86 |
| Maximum tensile strength (kg./cm.$^2$) | 252 |
| Elongation at break (%) | 550 |

Also the vulcanisate is only slightly swollen when immersed and allowed to stand in hot mineral or vegetable oils.

Example 3

80 parts of 2-chlorobutadiene-1:3 and 20 parts of 1-cyanobutadiene-1:3 are added to a solution of 8 parts of sodium cetyl sulphate in 400 parts of water. The whole is emulsified by rapid stirring with the temperature adjusted to 20° C. and kept at this with stirring for 23 hours. 0.5 part of tetramethylthiuram disulphide and 0.5 part of phenyl-β-naphthylamine are added and the latex coagulated with 400 parts of saturated aqueous sodium chloride solution. The coagulum is washed and dried and yields 80 parts of an elastic rubber-like material.

Example 4

The rubber-like material of Example 3 is compounded and vulcanised as described in Example 2. The vulcanisate has the physical properties shown below. The properties of a vulcanisate made in a similar way from a similar mix containing 100 parts of neoprene (polymerised 2-chlorobutadiene-1:3) are given for comparison.

|  | Vulcanisate of Example 4 | Vulcanised neoprene |
|---|---|---|
| Hardness | 64 | 60 |
| Maximum tensile strength | 356 | 290 |
| Elongation at break | 610 | 660 |
| Resilience | 61.3 | 54 |
| Permanent set | 6 | 12 |
| Swelling in Diesel oil | 16 | 54 |

The figures for hardness, maximum tensile strength and elongation at break are in the same units as the corresponding ones in Example 2. Resilience is expressed as a percentage energy return, permanent set as % increase in length in millimetres and swelling in Diesel oil as a percentage increase in volume.

The testing methods which were used in this and other examples in this specification are the following.

(1) Tensile strength and elongation at break were determined using a Schopper machine with a jaw separator speed of 40 cm. per minute. The test rings were cut from sheet 4 mm. thick.

(2) Permanent set was determined on samples 10 cm.×4 mm.×1 mm. provided with marks 5 cm. apart. The sample is stretched to one half the elongation at break, for 15 minutes, released and rested for 1 hour at 22° C. before measurement.

(3) Hardness and elasticity were tested at laboratory temperature with standard Shore instruments using sheets 4 mm. thick.

(4) Resilience was measured on strips of material 8 mm.×8 mm.×4 mm. on a Bendulum Tripsometer similar to that described by Barnett & Matthews, Ind. Eng. Chem., 1934, 26, 1292. The results are expressed as percentage energy return.

(5) Oil and solvent absorption tests were carried out with discs 4 mm. thick and 44.7 mm. diameter. Solvent swelling was carried out at laboratory temperature for two days and oil swelling at 70° C. for 7 days.

Example 5

80 parts of 2-chlorobutadiene-1:3, 20 parts of 1-cyanobutadiene-1-3 and 1 part of p-toluenesulphinic acid are added to 440 parts of a solution containing 8 parts of sodium cetyl sulphate, 0.9 part of acetic acid and 0.02 part of sodium acetate. The whole is emulsified by rapid stirring and the temperature adjusted to 20° C. and kept at this for 1¼ hours. The resulting latex is treated as in Example 1 and yields 96 parts of a rubber-like material.

Example 6

The product obtained in Example 5 is included in the following mix:

|  | Parts |
|---|---|
| Product of Example 5 | 100 |
| Light calcined magnesia | 10 |
| Lamp black | 30 |
| Pine tar | 5 |
| Channel black | 35 |
| Sulphur | 1 |
| Phenyl-β-naphthylamine | 2 |
| Zinc oxide | 10 |

The mix is cured for one hour at 141° C.

The vulcanisate has the physical properties shown below. The properties of a vulcanisate made in a similar way from a similar mix containing 100 parts of neoprene are given for comparison:

|  | Vulcanisate of Example 6 | Vulcanised neoprene |
|---|---|---|
| Maximum tensile strength | 239 | 232 |
| Elongation at break | 311 | 293 |
| Hardness | 78 | 75 |
| Swelling in Diesel oil | 15 | 48 |
| Swelling in mineral oil | 4 | 19 |
| Swelling in petrol | 6 | 42 |

Examples 7–16

These are given in tabular form below. The quantities of 2-chlorobutadiene-1:3, 1-cyanobutadiene-1:3, water and emulsifying agent are in columns 2 to 5. Any modifying agents or other substances added for polymerisation purposes are mentioned in column 6. Emulsification and polymerisation are effected as in the foregoing examples, and with the times and temperatures in columns 7 and 8. At the end of the tabulated time there are added 0.5 part of tetramethylthiuram disulphide and 0.5 part of phenyl-β-naphthylamine and the latex is coagulated by adding 400 parts of saturated aqueous sodium chloride solution and the coagulum washed and dried as before. The resulting rubber-like products are then compounded and vulcanised as in Example 2 and samples of the vulcanisates tested. The results of the tests are shown in columns 10-15.

| 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|
| Number | 2-chlorobutadiene-1:3 | 1-cyanobutadiene-1:3 | Water | Cetyl sodium sulphate | Electrolytic substances, plasticiser, antioxidants, etc. | Time | Temperature | Yield | Hardness | Tensile | Elongation | Permanent set | Resilience | Swelling in Diesel oil |
| | Parts | Parts | Parts | Parts | | Hours | °C. | Parts | Degrees Shore | Kg./cm.² | Percent | | Percent | Percent |
| 7 | 95 | 5 | 400 | 8 | | 22 | 20 | 83 | | | | | | 34 |
| 8 | 70 | 30 | 400 | 8 | | 44 | 20 | 75 | 71 | 301 | 455 | 7 | | 5 |
| 9 | 60 | 40 | 400 | 8 | | 27 | 20 | 82 | 72 | 280 | 453 | 6 | | 5 |
| 10 | 80 | 20 | 400 | 8 | | 22 | 5 | 74 | 62 | 289 | 527 | | 55 | 10 |
| 11 | 80 | 20 | 400 | 8 | | 17 | 40 | 79 | | | | | | 9 |
| 12 | 80 | 20 | 440 | 8 | 0.5-S, 0.9 C₂H₄O₂, 0.02 NaC₂H₃O₂ | 18 | 20 | 95 | | | | | | 8 |
| 13 | 80 | 20 | 400 | (*) | | 19 | 20 | 90 | 69 | 306 | 535 | | 53 | 13 |
| 14 | 80 | 20 | 400 | 8 | 1-SO₂ | 19 | 20 | 90 | 61 | 327 | 660 | | 60 | 10 |
| 15 | 80 | 20 | 400 | 8 | 25-C Cl₄ | 19 | 20 | 94 | 66 | 305 | 633 | | 57 | 15 |
| 16 | 80 | 20 | 400 | 8 | 0.9 C₂H₄O₂, 0.02 NaC₂H₃O₂ | 19 | 20 | 84 | | | | | | 8 |

* Sodium isopropyl naphthalene sulphonate (8 parts) used as emulsifying agent.

*Example 17*

75 parts of 2-chlorobutadiene-1:3, 15 parts of 1-cyanobutadiene-1:3 and 10 parts of acrylonitrile are added to 440 parts of a solution containing 8 parts of sodium cetyl sulphate, 0.9 part of acetic acid and 0.02 part of sodium acetate. The mixture is then agitated at 20° C. for 5 hours. The latex is coagulated and the coagulum washed and dried. After vulcanisation a good oil resistant product is obtained.

We claim:

1. Process for the manufacture of new synthetic rubber-like materials which comprises polymerizing, in aqueous emulsion, 1-cyanobutadiene-1,3 together with 2-chlorobutadiene-1,3, the latter material being present in larger amounts than the former material.

2. Process for the manufacture of new synthetic rubber-like materials which comprises polymerizing, in aqueous emulsion, a mixture comprising from 5 per cent to 50 per cent 1-cyanobutadiene-1,3 and from 95 per cent to 50 per cent 2-chlorobutadiene-1,3.

3. Process for the manufacture of new synthetic rubber-like materials which comprises polymerizing, in aqueous emulsion, a mixture comprising about 20 per cent 1-cyanobutadiene-1,3 and about 80 per cent 2-chlorobutadiene-1,3.

4. A synthetic rubber-like material comprising an interpolymer of about 20 per cent 1-cyanobutadiene-1,3 and about 80 per cent 2-chlorobutadiene-1,3.

5. Cured synthetic rubber-like material wherein the rubber-like ingredient is an interpolymer of about 20 per cent 1-cyanobutadiene-1,3 and about 80 per cent 2-chlorobutadiene-1,3.

6. A synthetic rubber-like material comprising a polymerization product of a mixture of about 5 to 50 per cent 1-cyanobutadiene-1,3 and about 95 to 50 per cent 2-chlorobutadiene-1,3.

7. Process for the manufacture of new synthetic rubber-like materials which comprises polymerizing in aqueous emulsion a mixture of about 5 to 50 per cent 1-cyanobutadiene-1,3 and about 95 to 50 per cent 2-chlorobutadiene-1,3, compounding and curing the rubber-like material thus obtained.

8. A cured synthetic rubber-like material wherein the rubber-like ingredient is a polymerization product of about 5 to 50 per cent 1-cyanobutadiene-1,3 and about 95 to 50 per cent 2-chlorobutadiene-1,3.

9. A synthetic rubber-like material comprising a polymerization product of a mixture of 1-cyanobutadiene-1,3 together with 2-chlorobutadiene-1,3, the latter material being present in greater amounts than the former material.

BERNARD JAMES HABGOOD.
ELIAS ISAACS.
LESLIE BUDWORTH MORGAN.